United States Patent Office 3,725,079
Patented Apr. 3, 1973

3,725,079
COATING FORMULATIONS CONTAINING PHOSPHATE ESTERS OF GLYCIDOL POLYETHERS
E. Scudder Mackey, Binghamton, N.Y., assignor to GAF Corporation, New York, N.Y.
No Drawing. Continuation-in-part of abandoned application Ser. No. 641,482, May 26, 1967. This application Nov. 23, 1970, Ser. No. 92,146
Int. Cl. G03c 1/38
U.S. Cl. 96—114.5                10 Claims

ABSTRACT OF THE DISCLOSURE

Coating aids for water-permeable colloid coating compositions comprising phosphate ester products of a glycidol polyether.

---

This application is a continuation-in-part of copending application Ser. No. 641,482 filed May 26, 1967, now abandoned.

This invention relates to coating compositions comprising a water-permeable colloid and more particularly, to gelatin coating compositions advantageously adapted for use in connection with high-speed coating methods.

As is commonly recognized in the coatings industry, it is highly desirable, if not essential, that water-permeable colloid, e.g., gelatin, containing coating compositions be capable of application at relative high coating speeds, and that the layers so deposited be of uniform and selected physical characteristics. The foregoing requirements are of primary import in operations associated with the preparation of photographic film elements. Ideally, coating aids contemplated for use in water-permeable colloid-containing compositions and especially those containing gelatin should:

(1) Be of uniform quality, properties, etc. from batch to batch;
(2) Enable the use of high-speed coating operations both in wet-on-wet and wet-on-dry coatings;
(3) Be devoid of any tendency to impart streakiness or repellency to the water-permeable colloid;
(4) Exhibit minimal sludge and/or foam formation;
(5) Produce coatings having little or no tendency to slip;
(6) Be non-photoactive Heretofore, considerable difficulty has been encountered in connection with attempts to provide water-permeable colloid layers of the desired characteristics while utilizing coating speeds which are consonant with feasible commercial operation and satisfactory product throughput. With gelatin compositions for example, and to which no auxiliary coating aid has been added, there are invariably obtained coated layers which exhibit manifold defects including, e.g., the presence of numerous crescent-shaped uncoated areas, also referred to as repellency spots, such defects approximating the size of a pinhead with streaks or other such irregularities emanating from the points of the crescent and proceeding in a direction opposite to that of the coating. It is not unusual to find that lightly coated areas of 5–10 mm. in diameter will result.

In an effort to overcome or otherwise mitigate the foregoing and related disadvantages, the art has resorted to the use of a variety of coating aids. Saponin for example, despite its relatively widespread use as a coating aid in gelatin compositions of various types has nevertheless proved somewhat unsatisfactory. Although yielding a relatively uniform and even coating, this material being of natural origin, may often vary markedly from batch to batch in quality, composition, purity and the like, to the extent that one or more of the properties required in the photographic emulsion may be deleteriously affected.

As a conesquence, considerable attention has been focused on the use of synthetic coating aids selected from a wide variety of surfactant materials of the anionic, cationic, amphoteric and/or non-ionic types; including for example, the taurides, betaines, imidazolinium salts, and the like. Since materials of the latter type may be subjected to relatively precise conditions of manufacture, problems associated with variations in quality, composition, purity and the like are substantially eliminated. Despite the foregoing advantage, however, the synthetic coating aids heretofore provided have nevertheless proved unsatisfactory in a number of important respects. As examples of the more important difficulties repeatedly encountered with the use of the latter materials and especially in connection with the preparation of photographic layers containing gelatin, there may be mentioned their tendency to produce streakiness and repellency spots that cannot be readily rewet with the consequent condition that the product tends to form "air-bells" on the emulsion surface during photographic processing. Such areas will often manifest themselves in the form of relatively small, undeveloped areas in the processed product due to the fact that in such areas the developer is incapable of penetrating into the emulsion layer. These defects are not only unsightly to the extent that retouching of the negative is often required, but more importantly, can be dangerously misleading when present on certain types of films particularly medical or industrial X-ray films.

The foregoing and related problems become increasingly manifest in connection with "wet-on-wet" coating methods wherein the water-permeable colloid composition is applied to a wet substrate. The latter is, of course, a matter of prime commercial importance and especially in connection with plural coating operatings wherein it is of utmost importance to eliminate any necessity for drying and thus the time which would otherwise be consumed thereby.

However, with the use of the coating aids heretofore provided, the "one pass-wet-on-wet" technique is found to be substantially inapplicable and accordingly, it becomes necessary to dry an applied layer prior to the application of an additional overcoating layer.

Thus, a primary object of the present invention resides in the provision of improved gelatin coating compositions advantageously adapted for application to both wet and dry surfaces via the use of high speed coating techniques in the virtual absence of skipping.

A further object of the present invention resides in the provision of coating aids for use with photosensitive gelatin emulsion compositions to facilitate the attainment of coatings which are uniform and repellency-free without deleteriously affecting the emulsion.

Other and related objects of the present invention will become apparent hereinafter as the description thereof proceeds.

The attainment of the foregoing and related objects is made possible in accordance with the present invention which in its broader aspects includes the provision of improved water-permeable colloid coating compositions and coated elements prepared therewith and wherein such compositions contain as an essential ingredient a relatively small amount of a coating aid comprising the phosphate ester of a glycidol polyether, the latter having the following general formula:

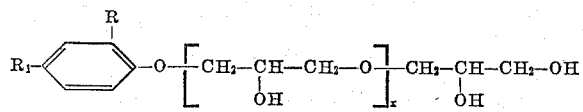

wherein R represents hydrogen or alkyl having from 1 to 18 carbon atoms, said alkyl group being either straight chain or branched; $R_1$ represents alkyl containing from 8 to 18 carbon atoms which, again, may be either strait chain or branched and $x$ represents a positive integer of from about 3 to about 30 inclusive and preferably from about 4 to about 20.

Although specific reference will be made to gelatin throughout the present description, the term water-permeable colloid as used herein is to be understood as encompassing water-soluble and/or dispersible materials whose aqueous solutions yield water-permeable films on drying. As particular examples of substances contemplated by the aforestated definition, there may be mentioned, without necessary limitation, the water-soluble cellulose esters of lactic or glycolic acid, partially hydrolyzed polyvinyl acetate, modified polyvinyl alcohol, water-soluble polyvinyl acetals, etc. The colloid material may also be suitably provided in the form of an aqueous dispersion, emulsion suspension, etc., such as would be the case with polymers derived from the polymerization of one or more acrylate monomers, e.g., ethylacrylate, methylmethacrylate, etc. Such polymeric substances are customarily provided in latex form by the use of suitable emulsifying agents, suspending agents, or the like.

The truly synergistic results provided by the novel coating aids of the present invention when incorporated into water-permeable colloid-containing coating compositions in general and those comprising gelatin in particular, are made readily manifest by reference to the fact that such compounds permit the effective use of coating speeds which at least double those necessarily employed heretofore with the virtual absence of the deleterious effects previously encountered, e.g., skipping. As previously mentioned, the coating of chilled emulsions with surface gelatin layers employing surfactant materials currently provided for such purposes is invariably attended by severe problems of skipping such problems becoming more pronounced with the use of higher web coating speeds. It is self-evident, of course, that increased web speeds are vital for increased product throughput. As will thus be recognized, the advantages provided by the present invention when considered solely from an economic standpoint are of the first order of significance.

The coating aids of the present invention can be effectively employed in relatively small concentrations, i.e., on the order of 0.01% and lower by weight based upon the total weight of the coating solution. It will be understood, of course, that larger quantities may be employed to advantage, for example, in amounts ranging up to 0.1 to 2.5% based upon the total weight of coating solution. The particular proportions employed will depend to a large extent upon the ultimate use contemplated for the coating composition in question. Accordingly, the aforementioned concentrations are not particularly critical serving only to define those proportions found in general to yield optimum results. With specific reference to photographic utility, for example, in those instances wherein the gelatin is to be incorporated directly into a photographic silver halide emulsion, the higher concentration ranges will ordinarily be found to be most effective.

The photographic emulsions prepared utilizing the phosphate ester coating aids of the present invention ordinarily comprise an aqueous solution of gelatin containing as the light-sensitive material a silver salt such as silver bromide, silver chloride, silver iodide as well as mixtures thereof. Such emulsions may be of the non-optically sensitized or optically sensitized emulsion. When preparing the photographic emulsion, the glycidol polyether phosphate ester may be added either before or after the addition of any of the other ingredients customarily employed in the manufacture of gelatin silver halide emulsions such as sensitizing dyes, hardeners and the like. The particular coating procedure employed may comprise any of the standard methods promulgated in the industry for such purposes. For example, the substrate to be coated may be passed through a trough or other reservoir containing the coating solution. The coating may be applied to a greater thickness than that desired ultimately and thereafter subjected to the action of suitable leveling means such as a doctor-blade or an air-brush which causes run-back of the coating composition thereby resulting in the obtention of an even surface. In some instances, the coating method may involve a hopper technique in which the thickness of the layer is regulated by the rate at which the coating composition is deposited upon the base, the latter being transported in a direction adjacent thereto.

Moreover, the glycidol polyether phosphate ester coating aids described herein may be employed to advantage in combination with one or more of the usual surface active materials employed in the coating of gelatin compositions. Such additional surfactant materials include, for example, the Igepons available commercially from the GAF Corporation with typical representatives including sodium, N-methyl-N-oleoyltaurate; sodium, N-methyl-N-capryryltaurate; sodium-N-methyl-N-palmitoyltaurate, etc. the imidazolinium class of surfactants such as any of those described in U.S. Patent 2,982,651; the betaines, e.g., cetyl betaine and the like. The aforedescribed mixtures of surfactants are found to be particularly efficacious in connection with coating methods involving "wet-on-wet" applications.

The glycidol polyether phosphate ester surface active materials of the present invention may be readily and conveniently prepared by contacting the glycidol polyether nonionic material with a polyphosphoric acid in molar proportions approximating 1:1. The reaction is preferably effected with the use of elevated temperatures for purposes of accelerating product formation; thus temperatures on the order of 75° C. are found to be eminently suitable for such purposes. Thus, for example, the synthesis of the phosphate ester of the reaction product obtained by the condensation of the glycidol with nonyl phenol can be effected by merely adding the requisite amount of polyphosphoric acid to the nonyl phenol glycidol product the latter maintained at a temperature of 45° C. with agitation constant throughout said addition. It is also advisable to provide an inert atmosphere, i.e., a nitrogen blanket over the surface of the nonyl phenol glycidol product during the course of the reaction. Upon completion of the polyphosphoric acid addition, the temperature of the reaction medium is raised to 90–95° C., held at this temperature for a period of approximately 4 days and then cooled to approximately 75° C. Hydrogen peroxide is then added and the temperature increased to 90–95° C., held at such temperature for 15 minutes and thereupon cooled to room temperature to yield the desired phosphate ester product. The preparatory procedure for the phosphate ester of the glycidol/isononyl phenol adduct is fully described hereinbelow in Example IB. The glycidol polyether materials employed for phosphation in accordance with the present invention may be readily and conveniently prepared, for example, by heating glycidol with an alkyl phenol of the following structural formula:

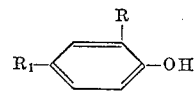

wherein R and $R_1$ have the aforedescribed significance. Suitable alkyl phenols include the following representatives:

p-isononylphenol
p-isododecylphenol
o-,p-di-isononylphenol
o-,p-di-isododecylphenol
p-tert-octylphenol
o-p-di-tert-octylphenol
p-tert-octyl-o-isononylphenol
p-tert-octyl-o-isododecylphenol
p-sec-octylphenol p-sec-dodecylphenol
p-sec-hexadecylphenol
p-sec-octadecylphenol
o-p-di-dodecylphenol
p-cetylphenol
p-ter-octyl-o-ter-butylphenol
p-octadecyl-o-cresol
p-iso-nonyl-o-tert-butylphenol, etc.

and mixtures comprising 2 or more of the foregoing. The preparatory procedure for the glycidyl-isononyl phenol adduct is fully described herein below in Example IA.

The reaction of the alkyl phenol and glycidol is preferably effected in the presence of an alkaline-reacting catalyst. Suitable catalysts for such purposes include the alkali metals, their oxides, hydroxides, alcoholates, phenates, cresolates, etc., as well as mixtures comprising two or more of such materials. Typical examples of the aforedescribed materials include sodium, lithium, potassium, sodium hydroxide, potassium hydroxide, sodium, methoIate, lithium methoIate, sodium isopropylate, sodium octadecylate, sodium phenate, potassium phenate, sodium cresolates, etc. The catalyst substance is most effectively employed in concentrations ranging from about 0.1 to about 2% by weight of the reaction mixture. The reaction may be carried out at elevated temperatures ranging from 100 to 200° C. and preferably from 130 to 160° C. The temperature selected in a particular circumstance will quite naturally be influenced somewhat by the reaction rate desired as well as the properties and relative proportions of the reactants.

Since glycidol tends to react with itself and especially under the conditions recommended herein for preparing the glycidolpolyether derivative, it is advisable to add the glycidol to a previously prepared solution containing the desired quantities of alkyl phenol and catalyst. The glycidol addition should be controlled in such manner that the concentration of glycidol in the reaction medium is not allowed to exceed approximately 2% by weight based upon the total weight of the reaction medium. Particularly beneficial results are obtained when the glycidol concentration is maintained at a value approximating 0.5% by weight of the reaction medium.

One of the salient advantages characterizing the phosphate ester derivatives of the present invention relates to their property of being totally inert with respect to the sensitometric characteristics of the silver halide photographic emulsion material. The importance of this particular aspect cannot be emphasized too strongly since any necessity for the conjunctive use of additional ingredients for purposes of compensating for any deleterious effects upon sensitometric properties which would otherwise arise is completely obviated. For example, it has been observed that a substantial number of the surface active materials heretofore promulgated and especially for use with photographic emulsions exhibit a pronounced tendency to adversely affect the sensitometric properties of the emulsion, e.g., the formation of fog, depresses sensitivity levels, etc. In many instances, the fugitive character of such materials can produce intolerable conditions to the extent that the use of added ingredients is made absolutely mandatory whereby to compensate for departures from optimum sensitometric behavior.

A further and significant advantage characterizing the glycidol polyether phosphate esters described herein relates to their property of being readily wetted by hydrophilic media; this is of primary import not only from the standpoint of expeditious coating, i.e., the ready deposition of uniform and repellency-free layers is permitted, but in addition from the standpoint of photographic processing. Thus, problems which might otherwise arise in connection with the obtention of efficient solution-emulsion contacting whereby to promote efficient development are completely eliminated. As will be apparent, the required developing time is correspondingly reduced.

The following examples are given for purposes of illustration only and are not to be considered as ncesssarily constituting a limitation on the present invention. All parts and proportions referred to herein and in the appended claims are by weight unless otherwise indicated.

EXAMPLE I (A) Preparation of glycidol/iso-nonylphenol adduct

To a glass container provided with a rapid-speed agitator and reflux condenser is added a mixture comprising 220 gms. of technical grade p-isononylphenol (1 mole) and 1 gm. of potassium hydroxide. The mixture is subjected to agitation and heated under a nitrogen atmosphere at a temperature of about 150° C. Approximately 432 gms. (6 moles) of glycidol are introduced into the alkyl phenol reaction mixture over a period of approximately 4½ hours maintaining constant agitation. Incremental additions of potassium hydroxide are made at intervals throughout the course of the reaction in order to maintain a total potassium hydroxide concentration in the reaction mixture approximating its initial value. The terminal point in the reaction is indicated by a negative test for phenol. Upon completon of the reaction, water is added in an amount approximating the total weight of the potassium hydroxide employed. The pH of the reaction media is brought to below 9 by the introduction of carbon dioxide and is thereafter allowed to cool to room temperature whereupon there is obtained a water-soluble, amber, viscous syrup which has the following structural formula:

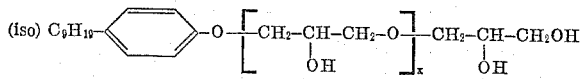

wherein $x$ has an average value of 5. The p-isononylphenol employed in the above example is available commercially and can be readily prepared by the condensation of phenol with tripropylene in the presence of an acid catalyst.

(B) Preparation of phosphate ester

The glycidol/isononyl phenol product prepared in A is converted to the phosphate ester according to the following technique. The isononyl phenyl/glycidol reaction product is heated to a temperature of approximately 45° C. Thereupon polyphosphoric acid in approximately equimolar amount relative to the glycidol polyether is added while maintaining agitation throughout such addition. The acid addition is effected under an inert atmosphere of nitrogen. Upon completion of the acid addition, the temperature of the medium is raised to 90–95° C. and held at such temperature for a period of 4 hours. The solution is then cooled to 75° C. and hydrogen pyroxide (2 gms. per 192 gms. of isononyl phenol/glycinol product) is added, the temperature being increased to 90–95° C. The latter temperature is maintained for a period of approximately 15 minutes and thereupon the medium is cooled to room temperature to thereby yield the phosphate ester derivative.

(C) Preparation of silver halide photographic emulsion

A coating composition is prepared comprising a gelatin silver halide photographic emulsion having a silver concentration of approximately 35 gms. per kg. of emulsion and a gelatin concentration of approximately 70 gms. per kg. of emulsion. Approximately 0.5% by weight total emulsion composition of the phosphate ester described in B above is added. The emulsion is thereupon coated onto a cellulose acetate film-base via the air-doctor blade technique at a web coating speed of approximately 150 ft. per minute. During the same coating pass, a surface coating composition comprising a 4% aqueous gelatin layer containing 0.4% by weight of conventional tauride coating aid is coated directly upon the wet, chilled emulsion utilizing the same web speed of 150 ft. per minute. The film sample thus coated is found upon examination to be totally free of defects such as typified by air bells, streaks or other irregularities. In addition, the surface layer exhibited firm-bonding with no tendency to strip, peel or otherwise separate from the subjacent silver halide layer.

By way of comparison, the above-described procedure is repeated but utilizing saponin as the sole surface active agent. In this particular instance, coating speeds of up to approximately 45 ft. per minute only were permitted; attempts to increase the web coating speed beyond this value are vitiated by severe problems of skipping, i.e., the surface coating layer failed to wet the silver halide layer with the consistency and uniformity required.

latter material is prepared utilizing the following procedure and proportions of reactants:

| | |
|---|---|
| Glycidol | moles 5.5 |
| p-Tert-octylphenol | do 1 |
| Sodium metal catalyst | gm 0.8 |

The glycidol is added to the alkyl phenol-catalyst mixture over a period of approximately 4 hours maintaining constant agitation throughout the addition. Upon completion of the reaction there is obtained a water-soluble, viscous syrup which analysis establishes to have the following structural formula:

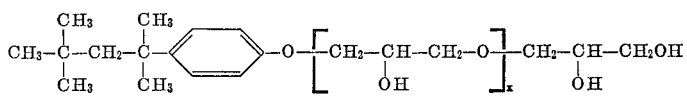

EXAMPLE II

Example I(C) is repeated except that the coating aid material comprises the phosphate ester of the reaction product obtained by the condensation of glycidol with p-isododecyl phenol. Phosphation is carried out in the manner described in Example I(B). Incorporation of the phosphate derivative into a photographic silver halide emulsion composition and coating according to the procedure described in Example I is found to provide similar results, i.e., coating speeds of 150 ft. per minute are effectively employed whereby to provide a coated film element totally devoid of objectionable defects.

The glycidol-p-isododecyl phenol adduct is prepared utilizing the following procedure and proportions of reactants:

| | Gms. |
|---|---|
| Glycidol | 173 |
| p-Isiododecylphenol | 88.5 |
| Potassium metal catalyst | 0.24 |

The total quality of glycidol is added to the alkyl phenol-catalyst mixture over a period of approximately 3 hours maintaining constant agitation. Upon completion of the reaction, there is obtained a water-soluble semi-solid and highly viscous compound which has the following structural formula:

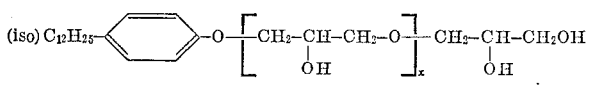

wherein $x$ has an average value of 6.

EXAMPLE III

Example I is repeated except that the coating aid employed comprises the phosphate ester of the reaction product obtained by the condensation of glycidol with o-p-di-isonoylphenol. The latter material is prepared utilizing the following procedure and proportions of reactants:

| | |
|---|---|
| Glycidol | moles 18.4 |
| o-p-Di-isononylphenol | do 1 |
| Potassium metal | gm 1 |

The glycidol is added to the alkyl phenol-catalyst mixture over a period of aproximately 8½ hours maintaining constant agitation. Upon completion of the reaction there is obtained a water-soluble semi-solid, highly viscous product of the following structural formula:

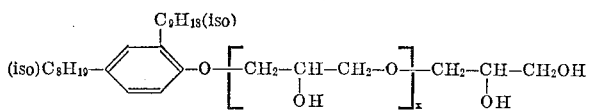

wherein $x$ has an average value of approximately 17.4.

EXAMPLE IV

Example I is repeated except that the coating aid employed comprises the reaction product obtained by the condensation of glycidol with p-tert-octylphenol. The wherein $x$ has an average value of approximately 4.5.

In each of Examples III and IV, the coated elements obtained, i.e., photographic emulsion layer having a gelatin surface coating deposited directly thereupon, displayed no coating defects having excellent structural stability.

As previously indicated, the glycidol polyether phosphate ester surface active agents described herein may be utilized in combination with one or more of the more conventional surface active agents such as the imidazolinium compounds described in U.S. Pat. 2,982,651, e.g., Monosodium salt of 2-undecyl-1-carboxymethyl-1-hydroxyethyl-imidazolinium hydroxide
Monosodium salt of 2-heptadecyl-1-carboxymethyl-1-hydroxyethyl-imidazolinium hydroxide
Disodium salt of 2-pentadecyl-1-carboxymethyl-1-hydroxyethyl-imidazolinum hydroxide
Disodium salt of 2-pentadecyl-1-carboxymethyl-1-hydroxyethyl-imidazolinium hydroxide
Monosodium salts of 2-nonyl-1-carboxymethyl-1-hydroxyethyl-imidazolinium hydroxide
Disodium salt of 2-heptadecenyl-1-carboxymethyl-1-hydroxyethyl-imidazolinium hydroxide
Disodium salt of 2-undecyl-1-carboxymethyl-1-($\beta$-carboxy-methyl-oxethyl)-imidazolinium hydroxide, etc.

It will further be understood that the nature of the additional surface active material is not a particularly critical factor in the practice of the present invention since any of the compounds conventionally employed in this regard may be used. For example, similar increases in coating speed are obtained with the use of, as additional surface active materials, protein condensation products of fatty acids, saponin, polyoxyethylene derivatives of long chain fatty acids, alcohols, etc., sulfated oleic acid, dihexyl ester of sodium sulfosuccinate, sodium salt of an alkylnaphthalene sulfonic acid, sodium salt of tetrahydronaphthalene sulfonic acid, calcium glycerin phosphate, alkylphenylpolyethylene glycol, oleic acid ester of hydroxyethane sulfonic acid, and sulfonates of high molecular weight primary or secondary aliphatic, aromatic and cycloaliphatic carboxy acids and the like.

Furthermore, the above described improvements are obtained whether the additional surface active material be of the non-ionic, anionic, amphoteric and/or cationic variety.

The improvements provided by the present invention are also obtained with silver halide emulsions which contain color formers which are provided with a solubilizing sulfo or carboxy group, and therefore, soluble in alkali solutions, for instance, sodium hydroxide solutions. Such color formers which upon color development with a primary amino developer yield azomethine, quinonimine or azine dyes, are described in U.S. Pats. 2,186,734; 2,445,252; 2,530,349; 2,671,021; 2,524,725; 2,354,552 and 2,547,037, The color coupler may be of the non-diffusing type which, when added to the silver halide emulsion dispersed in a mixture of high boiling and low boiling solvents, forms packet-type emulsions with capsulated color formers. Such color formers are known to persons skilled in the art. Typical representatives are described in U.S. Pats. 2,186,852; 2,179,239; 2,179,244; 2,298,443; 2,369,489 and 2,511,231.

Although the present invention has been particularly described with reference to the preparation of photographic silver halide emulsions, it will be understood that the coating compositions provided by the present invention may comprise simply a mixture of gelatin or other water-permeable colloid with one or more of the phosphate ester coating aids. Such compositions find utility in a wide variety of applications and may be applied as such to any number of substrate materials for purposes of providing a suitable overcoat. For example, they may be employed to advantage as protective coatings for paper, plastics such as films of cellulose nitrate, cellulose esters, e.g., cellulose acetate, cellulose acetate butyrate and the like. In addition, they may be applied in the form of antihalation layers, antistatic layers, filter layers or in any type of gelatin layer which is coated from a composition consisting essentially of an aqueous solution of gelatin. For example, gelatin coating compositions intended for

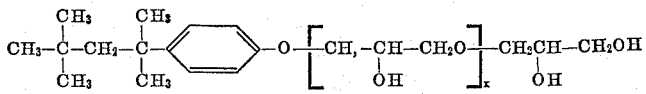

use as auxiliary layers, surface layers, etc. will usually contain the gelatin in amounts approximately 2–3% by weight of the total composition. However, when employed in the preparation of photographic emulsions, it is usually advisable to employ larger proportions of coating aid than would customarily be employed in aqueous solutions of gelatin intended for use as simple overcoatings. Moreover, in some instances, it may be advantageous to employ larger proportions even though the coating composition in question is intended for use as a simple auxiliary, i.e., non-image forming layer since, in general, larger concentrations are found to permit the more effective use of higher coating speeds. In general, increased proportions of coating aid are usually desirable where the gelatin is employed in minor concentrations. The pH of the coating composition would ordinarily fall within a range of about 5 to 8. If applied as an auxiliary layer, e.g., as a non-curling layer in a photographic film element, an acid pH range is usually preferred.

This invention has been described with respect to certain preferred embodiments and there will become obvious to persons skilled in the art other variations, modifications, and equivalents which are to be understood as coming within the scope of the present invention.

What is claimed is:

1. A coating composition comprising a water permeable colloid and a coating aid therein comprising from 0.01 to 2.5% by weight of the coating composition of the phosphate ester of a glycidol polyether of the following structural formula:

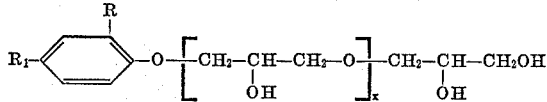

wherein R represents hydrogen or alkyl containing from 1 to 18 carbon atoms, $R_1$ represents alkyl containing from 8 to 18 carbon atoms and $x$ represents a positive integer of from 3 to 30 inclusive.

2. A composition according to claim 1, wherein said coating aid comprises the phosphate ester of a glycidol polyether of the following structural formula:

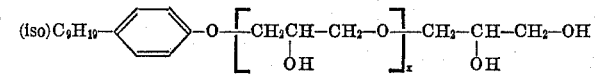

wherein $x$ has an average value of 5.

3. A composition according to claim 1, wherein said coating aid comprises the phosphate ester of a glycidol polyether of the following structural formula:

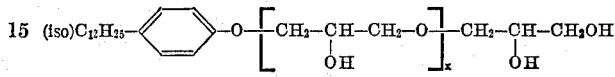

wherein $x$ has an average value of 6.

4. A composition according to claim 1, wherein said coating aid comprises the phosphate ester of a glycidol polyether of the following structural formula:

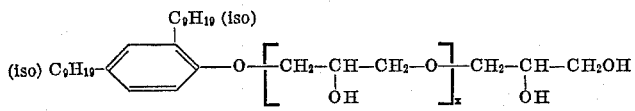

wherein $x$ has an average value of approximately 17.4.

5. A composition according to claim 1, wherein said coating aid comprises the phosphate ester of a glycidol polyether of the following structural formula:

wherein $x$ has an average value of approximately 4.5.

6. An article of manufacture comprising a support coated with the composition of claim 1.

7. A photographic silver halide emulsion containing therein as a coating aid from 0.01 to 2.5% by weight of the emulsion of the phosphate ester of a glycidol polyether of the following structural formula:

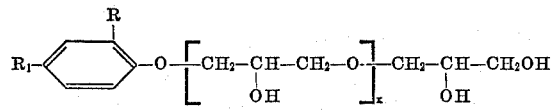

wherein R represents alkyl having from 1 to 18 carbon atoms, $R_1$ represents alkyl from 8 to 18 carbon atoms and x represents a positive integer from 3 to 30.

8. A multi-layer, light-sensitive photographic element wherein at least one layer as coated from a coating solution comprises a water-permeable colloid and 0.01 to 2.5% by weight of the layer as coated from the coating solution of the phosphate ester of a glycidol polyether of the following structural formula:

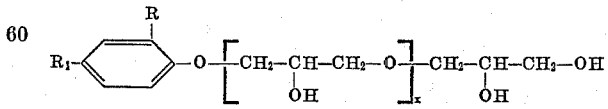

wherein R represents alkyl having from 1 to 18 carbon atoms, $R_1$ represents alkyl from 8 to 18 carbon atoms and $x$ represents a positive integer from 3 to 30.

9. A photographic element according to claim 8, wherein at least one of the layers containing the said coating and comprises a light-sensitive silver halide emulsion layer.

10. A coating composition comprising a water permeable colloid and a coating aid therein comprising from 0.01 to 2.5% by weight of the coating composition of a phosphate ester of a glycidyl polyether prepared by reacting one mole of the reaction product of glycidol and an alkyl phenol having the following structural formula

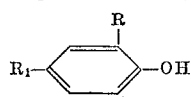

wherein R represents hydrogen or alkyl containing from 1 to 18 carbon atoms and $R_1$ represents alkyl containing from 8 to 18 carbon atoms with one mole of polyphosphoric acid.

References Cited

UNITED STATES PATENTS 3,514,293   5/1970   Knox _____ 96—114.5

FOREIGN PATENTS

| 39,621 | 5/1965 | East Germany. | |
| 734,884 | 5/1966 | Canada | 96—94 |
| 737,412 | 6/1966 | Canada | 96—94 |

J. TRAVIS BROWN, Primary Examiner

J. R. HIGHTOWER, Assistant Examiner

U.S. Cl. X.R.

96—114; 106—125